(12) United States Patent
Fujio

(10) Patent No.: US 11,104,523 B2
(45) Date of Patent: Aug. 31, 2021

(54) CONVEYING AND SORTING APPARATUS

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 16/940,011

(22) Filed: Jul. 27, 2020

(65) Prior Publication Data
US 2020/0361719 A1    Nov. 19, 2020

Related U.S. Application Data

(63) Continuation of application No. PCT/JP2019/010355, filed on Mar. 13, 2019.

(30) Foreign Application Priority Data

Apr. 27, 2018 (JP) .............................. JP2018-086870

(51) Int. Cl.
*B65G 47/94* (2006.01)
*B65G 21/20* (2006.01)
*B65G 47/46* (2006.01)
*F16B 31/02* (2006.01)
*F16B 33/00* (2006.01)

(52) U.S. Cl.
CPC ....... *B65G 47/945* (2013.01); *B65G 21/2072* (2013.01); *B65G 47/46* (2013.01); *F16B 31/021* (2013.01); *F16B 33/006* (2013.01); *B65G 2207/40* (2013.01); *B65G 2812/02069* (2013.01)

(58) Field of Classification Search
CPC .. B65G 47/945; B65G 21/2072; B65G 47/46; B65G 2207/40; B65G 2812/02069; F16B 31/021; F16B 33/006

USPC ................................................ 198/370.04
See application file for complete search history.

(56) References Cited

U.S. PATENT DOCUMENTS 9,878,852 B2 * 1/2018 Sorensen ............. B65G 47/945

FOREIGN PATENT DOCUMENTS

| JP | 2006008279 A | 1/2006 | |
|---|---|---|---|
| JP | 2015501770 A | 1/2015 | |
| JP | 2016037368 A | 3/2016 | |
| WO | WO-02055415 A1 * | 7/2002 | ........... B65G 47/945 |
| WO | 2013075714 A1 | 5/2013 | |
| WO | WO-2013075714 A1 * | 5/2013 | ........... B65G 47/962 |

* cited by examiner

*Primary Examiner* — Gene O Crawford
*Assistant Examiner* — Lester Rushin, III
(74) *Attorney, Agent, or Firm* — St. Onge Steward Johnston & Reens LLC

(57) ABSTRACT

A conveying and sorting apparatus has a plurality of tilting conveyor units in the conveying direction. Each tilting conveyor unit is able to swing to the left and right about a support shaft, between a horizontal conveying orientation and a tilted orientation for ejecting objects being conveyed by means of gravity. Both side edges in the left and right swinging direction are provided with side guides which restrict the width of the conveying path, and at least the side guide on the side to which the conveyor unit swings in the tilted orientation, is supported so as to be able to open in the swinging direction towards the tilted orientation with respect to the structure of the tilting conveyor unit, and is held in a standing orientation by the orientation holding means until a certain load or more is applied in to said side guide in the opening direction.

9 Claims, 13 Drawing Sheets

CONVEYING AND SORTING APPARATUS

FIELD OF THE INVENTION

The present invention relates to a conveying and sorting apparatus capable of laterally sliding and sorting a conveyed object by gravity at a sorting position set on a conveying path of the conveyed object.

BACKGROUND OF THE INVENTION

As the conveying and sorting apparatus as described above, as described in Patent Literature 1, there is known a conveying and sorting apparatus including a plurality of tilting conveyor units arranged in a row in a conveying direction, each of the tilting conveyor units supported so as to be swingable left and right about a support shaft parallel to the conveying direction of the conveyed object between a horizontal conveying orientation and a tilted orientation for discharging the conveyed object laterally with respect to the conveying direction of the conveyed object by gravity, and having side guides erected on both sides in a left-right swinging direction and regulating a conveying path width when the tilting conveyor unit is in the horizontal orientation. Such a conveying and sorting apparatus is used in such a manner that a tray having a height not lower than the side guides is used together instead of directly placing and conveying the conveyed object on conveying conveyors provided to each tilting conveyor unit, and the conveyed object placed on the tray is slid on the tray by tilting the tilting conveyor units from the horizontal orientation to the tilted orientation and discharged laterally so as to pass above the side guide, and then the tilting conveyor units supporting the tray are returned from the tilted orientation to the original horizontal orientation.

CITATION LIST

Patent Literature

Patent Literature 1: Japanese Translation of International Application (Kohyo) No. 2015-501770

SUMMARY OF THE INVENTION

Technical Problem

In the conveying and sorting apparatus described in Patent Literature 1 above, when the switching of the tilting conveyor units to the tilted orientation for starting the above-described sorting operation and the switching of the tilting conveyor units to the horizontal orientation after sorting completion are performed without stopping the tray, among the tilting conveyor units arranged in a row in the conveying direction, a plurality of tilting conveyor units which are located in an area supporting the entire traveling tray and on the traveling direction side of the tray farther than this area need to be switched in a timely manner to the tilted orientation or the horizontal orientation. However, even if the switching of the tilting conveyor units to the horizontal orientation after the sorting completion is performed in a timely manner as set, slight variations in the traveling speed of the tray occur due to a contact of the tray to the side guide on the lower side of the tilt and a change in the orientation of the tray within the conveying path width between the both left and right side guides, etc. As the conveying speed of the tray increases, the variations in the traveling speed of the tray also increase. As a result, there has been a problem that such an accident occurs that the side guide on the lower side of the tilt of the tilting conveyor unit in the process of returning and swinging from the tilted orientation to the horizontal orientation collides with a front end corner of the traveling tray and then the side guide on the lower side of the tilt is forcibly bent outward or the front end corner of the tray is damaged.

Solution to Problem

The present invention proposes a conveying and sorting apparatus capable of solving the conventional problems as described above. Described by giving reference signs in parentheses used in the description of embodiments described below in order to facilitate understanding the relationship with the embodiments, the conveying and sorting apparatus according to the present invention is a conveying and sorting apparatus including a plurality of tilting conveyor units (10, 11) arranged in a row in a conveying direction, each of the tilting conveyor units (10, 11) supported so as to be swingable left and right about a support shaft (7, 19) parallel to a conveying direction of a conveyed object between a horizontal conveying orientation and a tilted orientation for discharging the conveyed object laterally with respect to the conveying direction of the conveyed object by gravity, and each of the tilting conveyor units (10, 11) having side guides (25a, 25b) erected on both sides in a left-right swinging direction and regulating a conveying path width, in which, of the side guides (25a, 25b), at least the side guide (25a/25b) on the side of swinging to the tilted orientation is supported so as to be openable to the swinging direction side toward the tilted orientation with respect to a structure (23) of the tilting conveyor unit (10, 11), and is juxtaposed with an orientation holding means (51) holding the side guide (25a/25b) in a standing orientation until load of a certain level or more in the opening direction acts on the side guide (25a/25b).

Effects of Invention

According to the configuration of the present invention described above, even when such a situation occurs that the side guide on the lower side of the tilt of the tilting conveyor unit in the process of returning and swinging from the tilted orientation to the horizontal orientation collides with the front end corner of the traveling tray, if the orientation holding means is configured such that an outward load acting on the side guide at that time overcomes the holding force of the orientation holding means, the side guide opens outward by overcoming the holding force of the orientation holding means by the collision of the front end corner of the tray, and the impact received from the tray at that time can be absorbed. Accordingly, such an accident that the side guide on the lower side of the tilt is forcibly bent outward by the tray or the front end corner of the tray is damaged as in the conventional case can be avoided.

When the above present invention is carried out, specifically, both of the left and right side guides (25a, 25b) can be supported so as to be openable outward with respect to the structure (23) of the tilting conveyor unit (10, 11), and the left and right side guides (25a, 25b) can also be juxtaposed with orientation holding means (51) holding the side guides (25a, 25b) in a standing orientation until load of a certain level or more in the opening direction acts on the side guides (25a, 25b). According to this configuration, although as a matter of course in the case where the tilting conveyor unit is configured to be swingable to both left and right sides and the present invention is carried out as a conveying and sorting apparatus capable of sorting to both left and right sides of the tilting conveyor unit, even in the case where the tilting conveyor unit is configured to be swingable to only either side and the present invention is carried out as a conveying and sorting apparatus capable of sorting to only either left or right side of the tilting conveyor unit, the side guide on the upper side of the tilt held in the standing orientation opens outward by an overload from the tray and absorbs the overload when such a situation occurs that a corner on the rear end side of the tray strongly presses the side guide on the upper side of the tilt outward when the front end corner of the traveling tray is caught by the lower side guide of the tilting conveyor unit in the process of swinging for returning from the tilted orientation to the horizontal orientation and the tray is slanted on the conveying surface. Thus, a deformation of the side guide on the upper side of the tilt or damage to the rear end corner of the tray can be avoided beforehand.

The orientation holding means (51) may have any configuration. For example, the orientation holding means (51) may be such that the structure (23) and the side guide (25a, 25b) are provided with plate portions (47a, 48a/47b, 48b) overlapping each other in the front-rear direction (conveying direction), and at least one of bolt holes provided to the both plate portions is a cut hole being open to the outside, and the side guide (25a, 25b) is fixed in the standing orientation with respect to the structure (23) by a bolt and nut penetrating through the bolt holes of the both plate portions in the front-rear direction (conveying direction). In this case, the bolt separates outward from the cut hole to make the side guide free when an external force having a magnitude exceeding fastening friction based on a fastening force by the bolt and nut acts on the side guide. Thus, the outward load acting on the side guide can be absorbed.

For the orientation holding means as described above, it is also possible to use an orientation holding means (51) which is configured such that the structure (23) and the side guide (25a, 25b) are provided with plate portions (47a, 48c) overlapping each other in the left-right lateral direction, and a bolt and nut (52) penetrating through and linking the both plate portions (47a, 48c) in the left-right lateral direction is provided, and at least a bolt (52a) of the bolt and nut (52) is made of synthetic resin, and the synthetic resin portion of the bolt and nut (52) is broken when load of a certain level or more in the opening direction acts on the side guide (25a, 25b). In this orientation holding means, the synthetic resin part of the bolt and nut is broken when load of a certain level or more in the opening direction acts on the side guide, and the side guide is switched to a free state. As compared with the case of adjusting the load at the time when the side guide is freed, by the degree of fastening of the bolt and nut as in the former orientation holding means, the magnitude of the load at the time when the side guide is freed is determined by at least a breaking strength in the axial direction of the synthetic resin bolt. Thus, the object can be achieved only by selecting the synthetic resin bolt to be used, and assembling of the side guide is simplified and facilitated, and the intended object can be achieved reliably.

When a very large external force acts outward on the side guide and the synthetic resin bolt of the bolt and nut is broken, the break occurs between a head portion and a shaft portion of the synthetic resin bolt. Thus, a broken part located on the structure interior side of the plate portion on the structure side of the both plate portions linked by the bolt and nut remains on the structure interior side, and a broken part located outside the plate portion on the side guide side violently scatters toward the outside of the side guide. As a matter of course, the outside of the side guide may be a structure which is covered with a cover plate, but it is desirable not to provide the cover plate because the attaching and detaching work of the cover plate is required in the mounting work of the side guide to the structure, the assembling work of the orientation holding means, or in the maintenance and inspection work. When the cover plate is not provided, the broken part violently scatters to the outside from the side guide when a situation occurs that the bolt and nut of the orientation holding means is broken as described above. When the broken part is a small bolt head portion, there is a high possibility of mixing in the peripheral equipment to cause failure. When the shaft portion of the synthetic resin bolt and the nut screw-fitted thereto scatter as the broken parts, there is a high possibility of posing a danger to nearby workers and visitors, etc., because the mass is large.

In order that the problems as above can also be solved, the synthetic resin bolt (52a) of the bolt and nut (52) can be arranged in an orientation in which a bolt head portion is located on the structure interior side of the plate portion (48c) on the structure (23) side of the both plate portions (47a, 48c), and a bolt and nut part (a shaft portion of the synthetic resin bolt (52a) and a nut (52b, 52c) screw-fitted thereto) located outside the plate portion (47a) on the side guide (25a, 25b) side of the bolt and nut (52) can be linked to one end side of a scatter preventing cord-like body (56), and the other end side of the cord-like body (56) can be locked to the structure (23) or the side guide (25a, 25b).

When the above configuration is carried out, the assembling work of the scatter preventing cord-like body is simplified and facilitated if the one end side of the scatter preventing cord-like body (56) is attached with a mounting plate (57) through which the bolt (52a) of the bolt and nut (52) penetrates and which is sandwiched and fixed by a double nut (52b, 52c) used for the bolt and nut part.

When the side guide is supported so as to be swingable left and right, generally, the side guide is pivotally supported by a pair of concentric front and rear support shafts (49a, 49b). The bolt and nut (52, 53) is desirably provided in a front and rear pair between the both support shafts (49a, 49b). In this case, the scatter preventing cord-like body (56) linked to the bolt and nut parts located outside the plate portion (47a) on the side guide (25a, 25b) side of the both bolts and nuts (52, 53) can be configured to be connected so as to form a single cord on the side opposite to the side where the bolt and nut parts are located of the structure (23) or the side guide (25a, 25b), through two through holes (58a, 58b) provided to the structure (23) or the side guide (25a, 25b). According to this configuration, resultantly, not only can the scattering of the broken parts at the time of breaking of the two front and rear bolts and nuts (52, 53) be prevented by the single cord-like body, but also labor and the addition of extra parts are avoided as in the case where the cord-like body is fixed to the structure or the side guide via a locking fitting.

Further, it is desirable to juxtapose an opening restricting means (50) to receive, at a certain angle, the side guide (25a, 25b) released from the holding in the standing orientation by the orientation holding means (51) and opened. According to this configuration, as compared with such a configuration that the side guide released from the holding in the standing orientation by the orientation holding means is allowed to be opened to the limit of hanging down from the side of the tilting conveyor unit, not only can the opened side guide be prevented from being caught by the related facility such as a chute for taking over the conveyed object juxtaposed aside of the tilting conveyor units, but also an accident can be prevented that results from falling of the tray from on top of the tilting conveyor units or a large protrusion of the front end portion of the tray from the conveying path.

When the holding in the standing orientation of the side guide by the orientation holding means is released, the tilting conveyor unit is returned to the horizontal orientation with the side guide opened outward. If a detecting means to detect the opened side guide at this time is juxtaposed, various inconvenient situations which may occur when the operation is continued as it is can be prevented beforehand by automatically stopping the conveying and sorting apparatus itself based on a detection signal of the detecting means, and it also becomes possible, by actuating an alarm or emergency light based on the detection signal, to notify a nearby worker, etc., of an abnormality to quickly take necessary measures. The detecting means in this case may be juxtaposed for each tilting conveyor unit. However, it is also helpful in cost reduction that the detecting means is formed by a photoelectric sensor (54) irradiating a detection light beam (45c) detecting the opened side guide (25a, 25b) from one end toward the other end of a group of the plurality of tilting conveyor units (10, 11) arranged in a row in the conveying direction.

DETAILED DESCRIPTION OF THE INVENTION

Figure 1A:
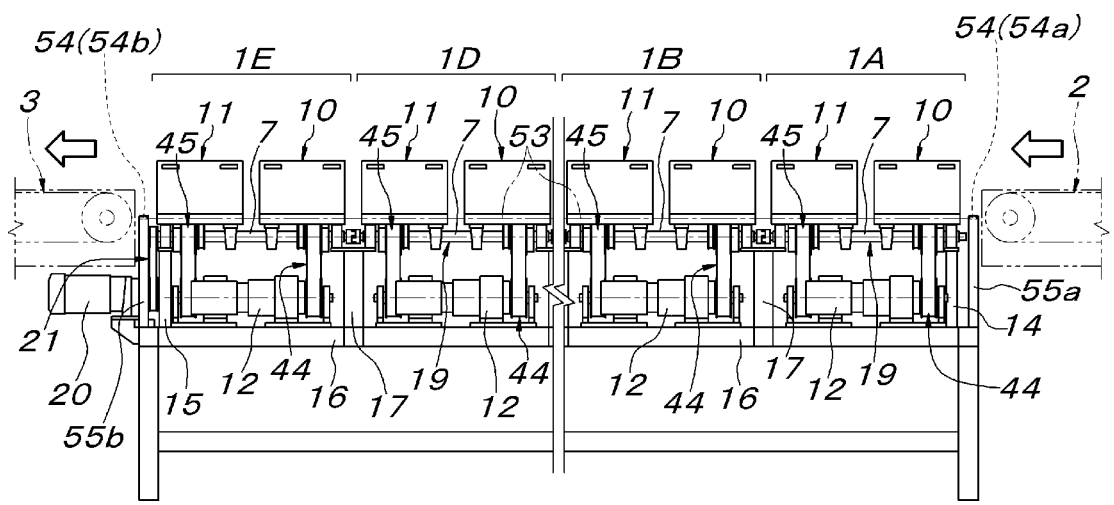
FIG. 1A is a partially omitted side view of a conveying and sorting apparatus.
Figure 1B:
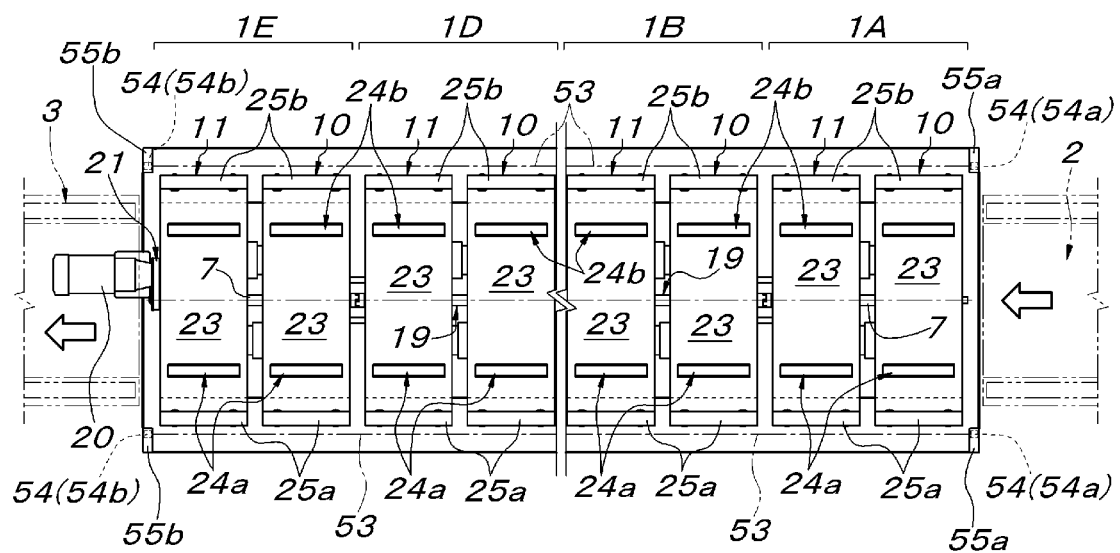
FIG. 1B is a plan view of the same.
Figure 2:
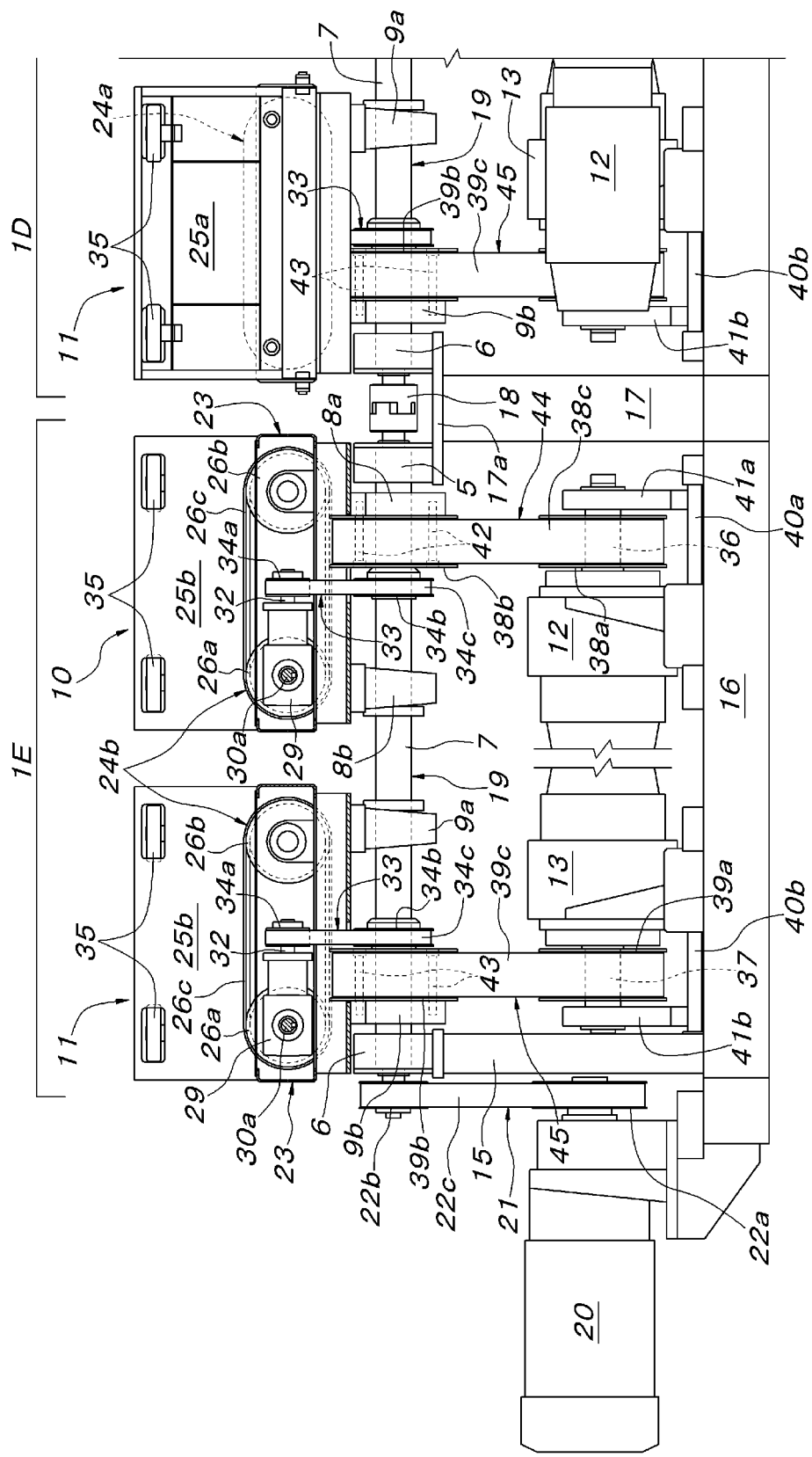
FIG. 2 is a side view of a main part showing an exit side area of the conveying and sorting apparatus.

FIG. 1A and FIG. 1B are a schematic side view and a plan view in which an illustration of a central assembly 1C of five assemblies 1A to 1E forming the conveying and sorting apparatus is omitted. A carry-in conveyor 2 is connected to an assembly 1A at an entrance side end portion, and a carry-out conveyor 3 is connected to an assembly 1E at an exit side end portion. In this embodiment, a sorting area is set at one or a plurality of locations on a conveying path for conveying a tray T loaded with a conveyed object. In this sorting area, the conveying and sorting apparatus according to the present invention is installed. The sorting of the conveyed object in this conveying and sorting apparatus is carried out by tilting the conveyed tray T in one of left and right sorting directions without stopping the movement in the conveying direction, and laterally and downwardly sliding and dropping the conveyed object loaded on the tray T from on top of the tray T by gravity.

Hereinafter, a detailed structure of each assembly 1A to 1E is described based on FIG. 2 to FIG. 5. Each assembly 1A to 1E is composed of a support shaft 7 having both ends rotatably supported by a pair of bearings 5, 6 in the conveying direction of the conveyed object, being parallel to the conveying direction of the conveyed object conveying and sorting apparatus, and horizontally located at a central position in a left-right width direction of the conveyed object conveying and sorting apparatus, a pair of front and rear tilting conveyor units 10, 11 supported by a pair of front and rear bearings 8a, 8b and 9a, 9b on this support shaft 7, respectively, and two tilting motors 12, 13 individually switching the tilting conveyor units 10, 11 between a horizontal conveying orientation and a tilted orientation. The bearings 5, 6 located at both ends in the conveying direction of the conveying and sorting apparatus among the pair of front and rear bearings 5, 6 of each assembly 1A to 1E are each supported above a frame 16 by one columnar support member 14, 15. Two adjacent bearings 5, 6 between two adjacent assemblies are supported on a common columnar support member 17 via a pedestal 17a.

Figure 4:
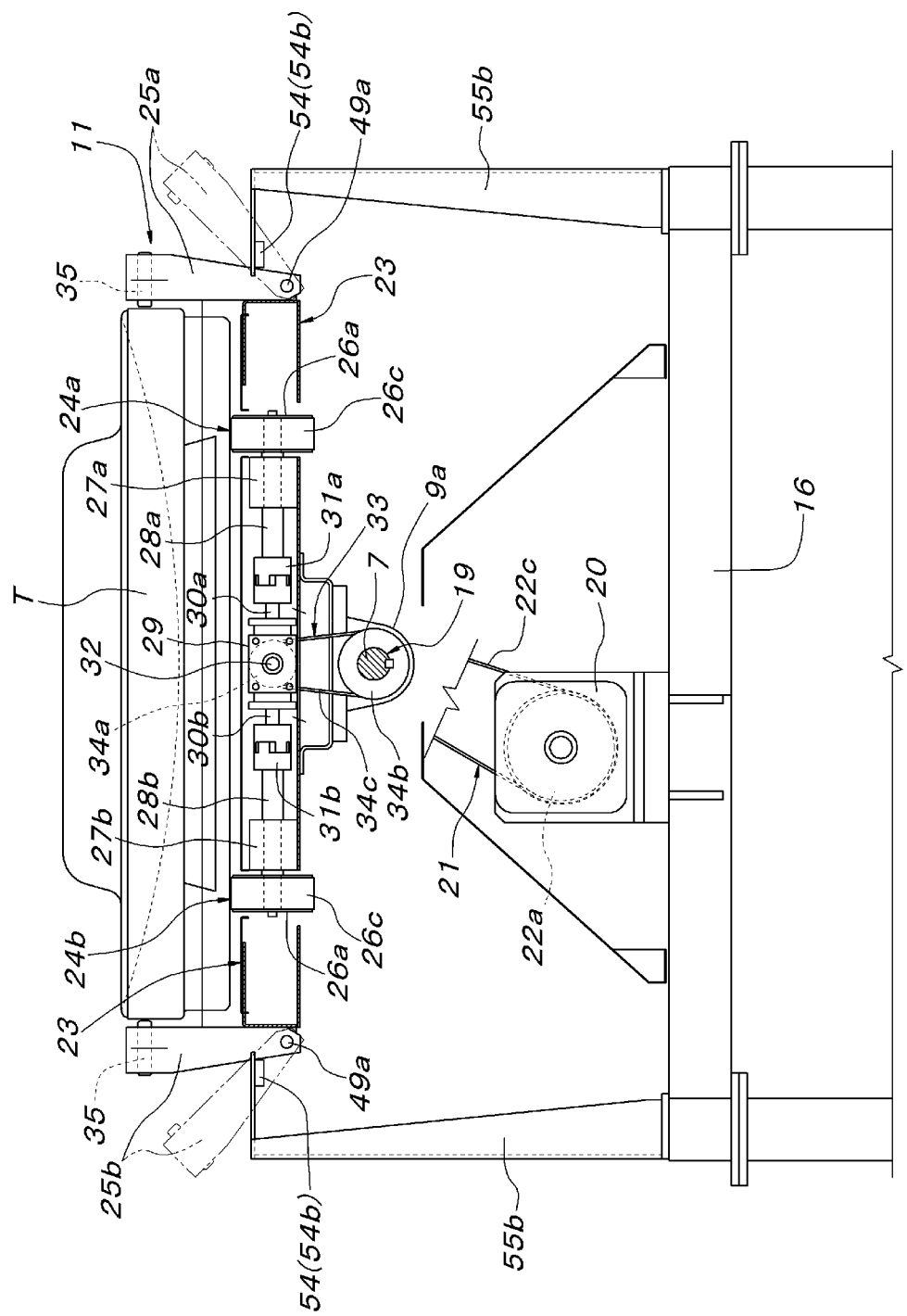
FIG. 4 is a partially cutaway front view showing the exit side of the conveying and sorting apparatus.

Between the two adjacent assemblies of the assemblies 1A to 1E, end portions of the support shafts 7 are concentrically interlockingly coupled to each other by a rotation transmitting joint 18, and a single interlocking transmission shaft 19 continuing over the overall length of the conveying and sorting apparatus is formed. As shown in FIG. 1A, FIG. 1B, and FIG. 4, at a free end of the support shaft 7 of the assembly 1E located at the exit side end portion of the conveying and sorting apparatus, one conveyor driving motor 20 supported by the frame 16 outside the assembly 1E is interlockingly coupled by a vertical winding transmission means 21. As the winding transmission means 21, a belt transmission means composed of a transmission-side pulley 22a, a driven-side pulley 22b, and an endless belt 22c stretched between both pulleys 22a, 22b is illustrated. However, the winding transmission means may be a winding transmission means using a chain.

Each tilting conveyor unit 10, 11 has the same structure and is composed of a structure 23 being horizontally long rectangular in plan view, a pair of left and right belt conveyors 24a, 24b for conveying the conveyed object provided to the structure 23, and side guides 25a, 25b attached along both left and right ends of the structure 23. The pair of left and right belt conveyors 24a, 24b are formed by stretching an endless belt 26c between a driving pulley 26a and a driven pulley 26b, and installed so that an upper conveying path portion of the endless belt 26c is exposed on an upper surface of the structure 23. A pair of left and right driving pulleys 26a located concentrically with each other are attached to outer end portions of a pair of left and right rotary shafts 28a, 28b supported in a left-right horizontal orientation by bearings 27a, 27b. Both rotary shafts 28a, 28b are interlockingly coupled, via rotation transmitting joints 31a, 31b, to output shafts 30a, 30b concentrically protruding to both left and right sides from a gear box 29 installed at a central position in the left-right width direction in the structure 23.

The gear box 29 includes a drive shaft 32 protruding rearward at the central position in the left-right width direction in the structure 23 and is configured such that both output shafts 30a, 30b are interlocked and rotated in the same direction at the same speed by the rotation of the drive shaft 32. The drive shaft 32 is interlockingly coupled to the interlocking transmission shaft 19 (the support shaft 7 of each assembly 1A to 1E) located directly below the drive shaft 32 by a winding transmission means 33. As the winding transmission means 33, a belt transmission means composed of a transmission-side pulley 34a, a driven-side pulley 34b, and an endless belt 34c stretched between both pulleys 34a, 34b is illustrated. However, the winding transmission means 33 may be a winding transmission means using a chain.

With the above configuration, by operating the one conveyor driving motor 20 installed at the exit side of the conveying and sorting apparatus, the pairs of left and right belt conveyors 24a, 24b provided to the pairs of front and rear tilting conveyor units 10, 11 of all of the assemblies 1A to 1E can be rotationally driven via the winding transmission means 33 and the gear boxes 29 from the interlocking transmission shaft 19 (the support shaft 7 of each assembly 1A to 1E) such that the tray T supported on the belt conveyors 24a, 24b is conveyed from the entrance side to the exit side of the conveying and sorting apparatus at a predetermined speed. In the tray T at this time, the conveying path is regulated at both left and right sides of the tray T by the side guides 25a, 25b erected on both left and right sides of each tilting conveyor unit 10, 11. Guide rollers 35 abutting and rolling on both left and right side surfaces of the tray T are pivotally supported at both front and rear end portions in the conveying direction of the side guides 25a, 25b.

Figure 3:
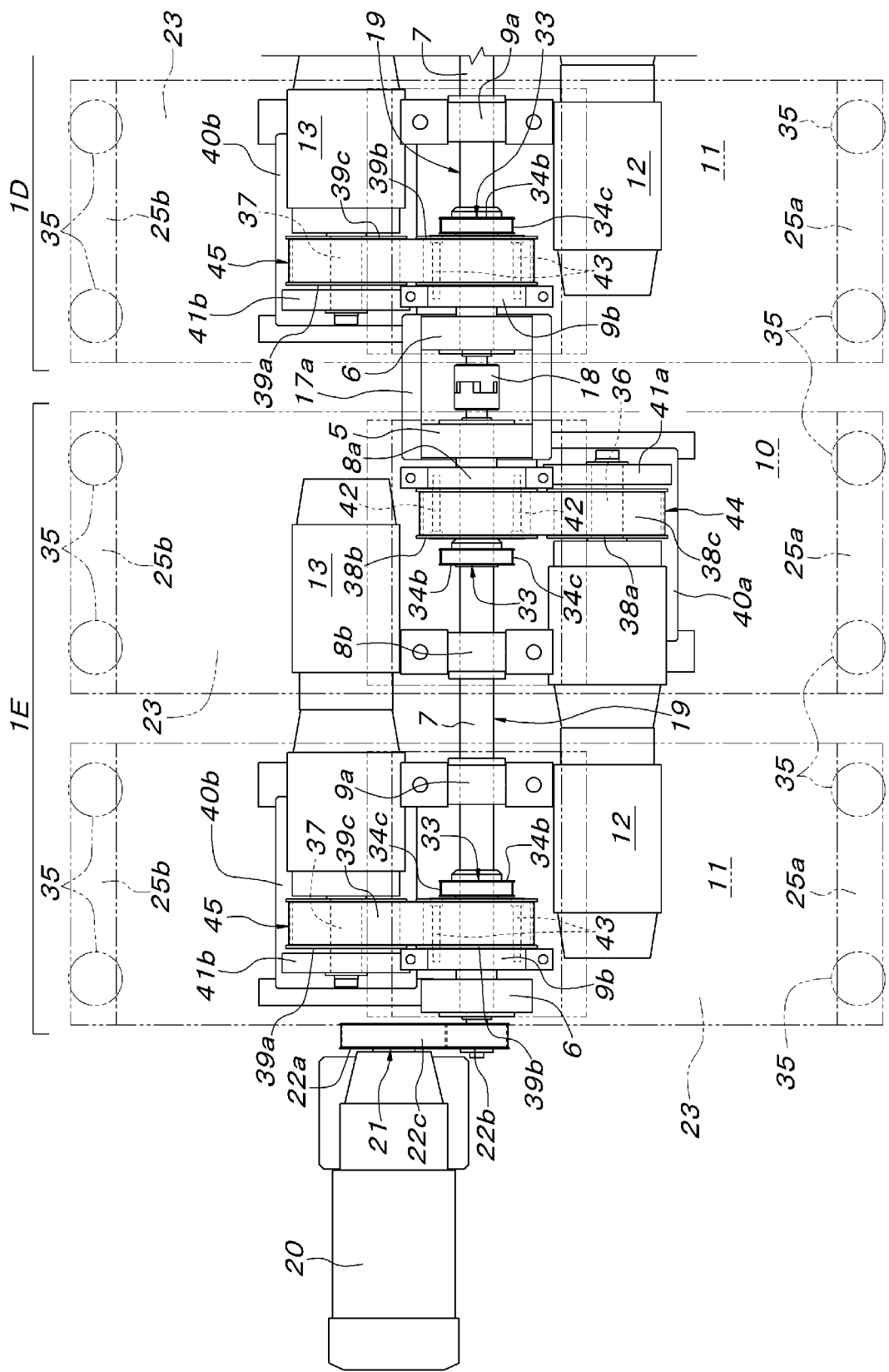
FIG. 3 is a plan view of the main part showing the exit side area of the conveying and sorting apparatus.

The pair of front and rear tilting conveyor units 10, 11 provided to the assemblies 1A to 1E are supported by the interlocking transmission shaft 19 (the support shaft 7 of each assembly 1A to 1E) via the pair of front and rear bearings 8a to 9b, respectively, so as to be tiltable in a direction along which both left and right end portions vertically move. In order to switch the tilting conveyor unit 10, 11 between the horizontal conveying orientation (see FIG. 5) supporting and conveying the tray T and the tilted orientation tilted about the support shaft 7, for example, about 45 degrees, in one of the left and right directions as shown in FIG. 6, the tilting motor 12, 13 is interlockingly coupled for every tilting conveyor unit 10, 11. For both tilting motors 12, 13, a speed reducer equipped with a large servomotor having an overall length in the axial center direction longer than the lateral width in the conveying direction of one tilting conveyor unit 10/11 and having a large driving torque is used. Thus, as shown in FIG. 3, the tilting motors 12, 13 are installed on the frame 16 so that the front and rear are reverse to each other at both left and right sides of the support shaft 7 in plan view and so that respective axial center directions become parallel to the support shaft 7.

More specifically, an output shaft 36, 37 of each tilting motor 12, 13 is attached with a transmission side timing belt pulley 38a, 39a. A free end portion of the output shaft 36, 37 protruding from the transmission side timing belt pulley 38a, 39a is supported by a bearing 41a, 41b attached on a mounting plate 40a, 40b supporting each tilting motor 12, 13. Thereby, the output shaft 36, 37 is made into a doubly supported structure. On the other hand, inside the bearings 5, 6 supporting both ends of the support shaft 7 of each assembly 1A to 1E, bearings 8a, 9b located on the outer side among the pair of front and rear bearings 8a to 9b for tiltably supporting each tilting conveyor unit 10, 11 by the support shaft 7 are adjacent. Further inside the bearings 8a, 9b, driven side timing belt pulleys 38b, 39b paired with the transmission side timing belt pulleys 38a, 39a are loosely fitted to the support shaft 7 so as to be relatively rotatable. These driven side timing belt pulleys 38b, 39b and the bearings 8a, 9b adjacent on the outer side are linked and integrated by a circumferential plurality of linking bolts 42, 43. Timing belts 38c, 39c serving as winding transmission tools are stretched around the transmission side timing belt pulleys 38a, 39a, and driven side timing belt pulleys 38b, 39b, and then winding transmission means 44, 45 using timing belts are thus configured. In other words, two tilting motors 12, 13 in an orientation in which the axial center direction is parallel to the support shaft 7 are installed on the frame 16 in a point symmetrical manner with respect to a central point in the length direction of the support shaft 7 at positions where the winding transmission means 44, 45 can be configured as above.

The mounting plate 40a, 40b supporting each tilting motor 12, 13 and the bearing 41a, 41b is mounted on the frame 16 so as to be positionally adjustable in the left-right lateral direction, and it is configured such that the tension adjustment of the timing belt 38c, 39c of the winding transmission means 44, 45 can be performed. The transmission-side pulley 34b of the winding transmission means 33 for transmitting the rotation of the interlocking transmission shaft 19 (the support shaft 7 of each assembly 1A to 1E) to the belt conveyors 24a, 24b of the tilting conveyor unit 10, 11 is attached to the support shaft 7 at a position adjacent to the inside of the driven side timing belt pulley 38b, 39b of the winding transmission means 44, 45, as shown in FIG. 3.

An example of a method of using the conveying and sorting apparatus configured as above will be described. As described above, the pairs of left and right belt conveyors 24a, 24b of the pair of front and rear tilting conveyor units 10, 11 provided to each assembly 1A to 1E are such that, by operating the one conveyor driving motor 20, its rotational force is transmitted to the driving pulleys 26a of the belt conveyors 24a, 24b via the winding transmission means 21 and the interlocking transmission shaft 19, and the winding transmission means 33, gear boxes 29, and rotary shafts 28a, 28b respectively corresponding to the tilting conveyor units 10, 11, and the endless belts 26c enter an operating state of rotating in a predetermined direction at a predetermined speed.

Figure 5:
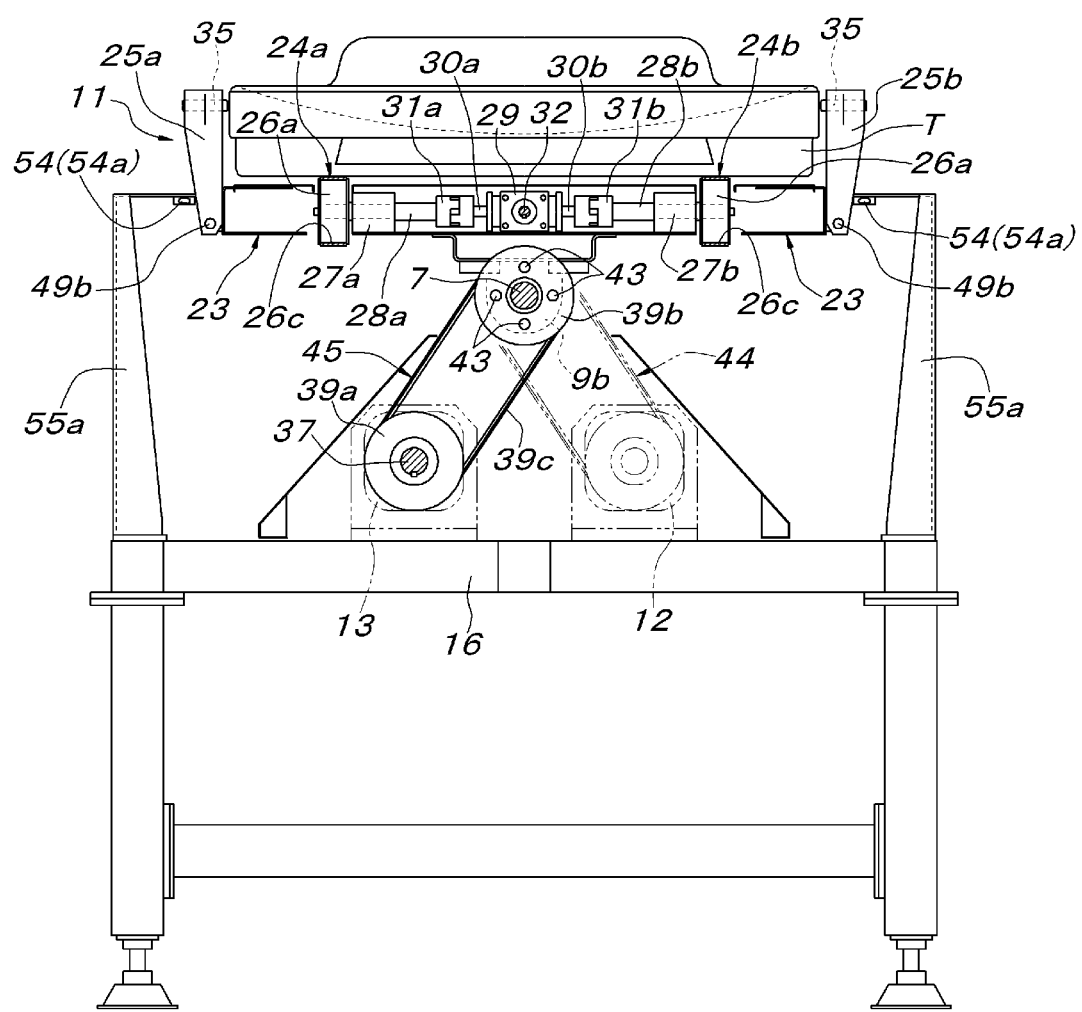
FIG. 5 is a longitudinal sectional rear view showing each assembly forming the conveying and sorting apparatus.
Figure 6:
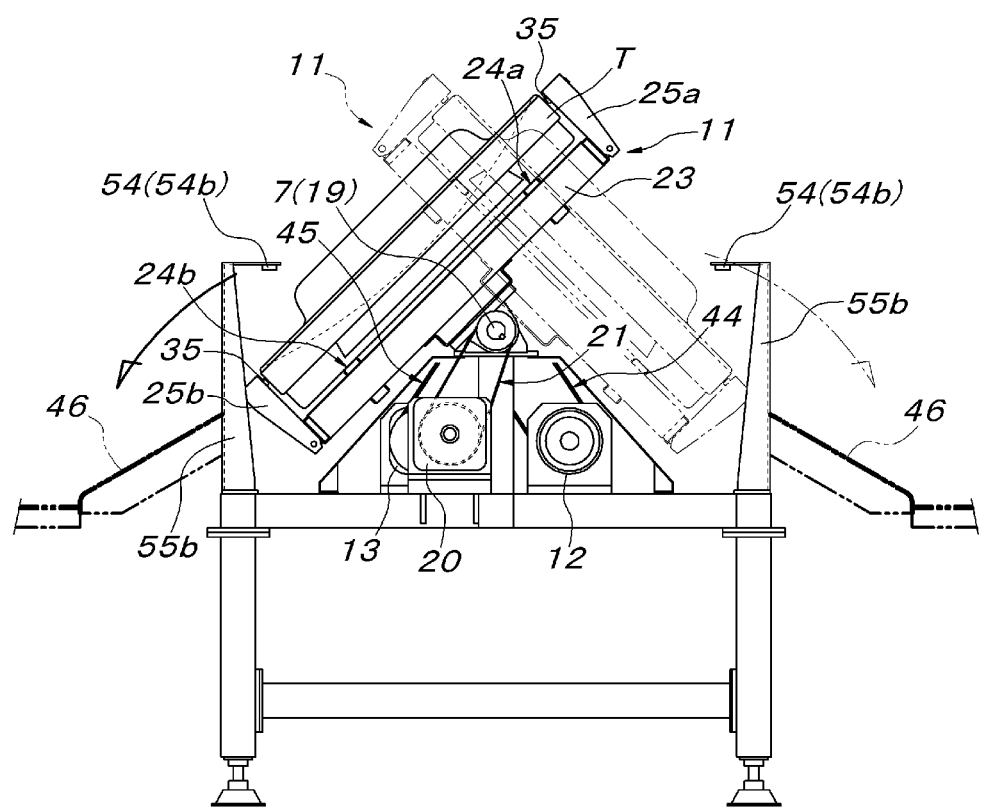
FIG. 6 is a front view showing a sorting operation of a tilting conveyor unit.

On the other hand, the tilting motors 12, 13 are stopped with the tilting conveyor units 10, 11 of all of the assemblies 1A to 1E being in the horizontal conveying orientation as shown in FIG. 5, so that the tilting conveyor units 10, 11 are held in the horizontal conveying orientation by the function of the tilting motors 12, 13 and do not swing about the support shaft 7/the interlocking transmission shaft 19 by gravity. Accordingly, with the tilting conveyor units 10, 11 of all of the assemblies 1A to 1E held in the horizontal conveying orientation, the conveyor driving motor 20 is operated as above to interlockingly rotationally drive the belt conveyors 24a, 24b in a predetermined conveying direction, and then the tray T loaded with the conveyed object sent in from the carry-in conveyor 2 shown in FIG. 1A and FIG. 1B can be conveyed toward the carry-out conveyor 3 at a constant speed and sent out onto the carry-out conveyor 3.

When a specific tilting conveyor unit 10, 11 is switched from the horizontal conveying orientation to the tilted orientation for sorting in a tray conveying state in which the belt conveyors 24a, 24b of the tilting conveyor units 10, 11 of all of the assemblies 1A to 1E are operated as above, the tilting motor 12/13 of the tilting conveyor unit 10/11 to be switched to the tilted orientation is operated and the rotation of its output shaft 36/37 is transmitted to the structure 23 of the target tilting conveyor unit 10/11 through the transmission side timing belt pulley 38a/39a, the timing belt 38c/39c, and the driven side timing belt pulley 38b/39b of the winding transmission means 44/45 and via the bearing 8a/9b linked and integrated by the linking bolts 42/43. Thereby, the target tilting conveyor unit 10/11 can be tilted about the support shaft 7 (the interlocking transmission shaft 19) in a predetermined direction by a rotation angle of the driven side timing belt pulley 38b/39b. When the tilting conveyor unit 10/11 in the tilted orientation is returned to the original horizontal conveying orientation, the tilting motor 12/13 of the tilting conveyor unit 10/11 is reversely rotated by the rotation angle at the time of tilting operation, and the tilting conveyor unit 10/11 can be returned from the tilted orientation to the original horizontal conveying orientation.

Figure 7:
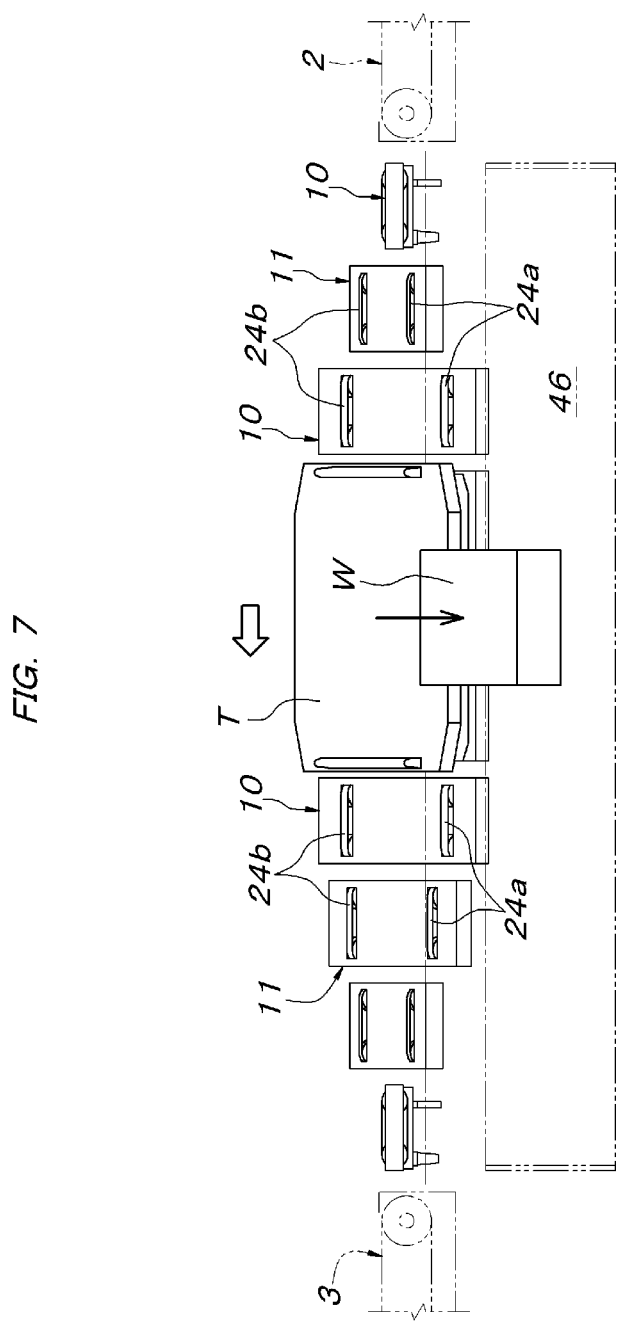
FIG. 7 is a schematic side view illustrating conveying and sorting operation of the conveying and sorting apparatus.

When the conveyed object loaded on the tray T sent from the carry-in conveyor 2 is the target to be sorted at a certain place of the conveying and sorting apparatus, as shown in FIG. 7, at the point in time at which the tray T travels a certain distance from the carry-in conveyor 2, the required number of tilting conveyor units 10/11 located in an area supporting the tray T and on the downstream side of this area are swung from the horizontal orientation toward the sorting side to be switched to the tilted orientation, and the traveling tray T, which the tilting conveyor units support, is tilted to the sorting side by a required angle. As a result, the conveyed object W on the tray T slides on the tray T toward the lower side of the tilt by gravity and then slips off from on top of the tray T. Generally, a chute 46 taking over the conveyed object W slipping off from on top of the tray T in the tilted orientation and guiding the object onto a target handling table is juxtaposed.

Even during the above-described sorting operation, the conveyance of the tray T is continued by the belt conveyors 24a, 24b provided to each tilting conveyor unit 10/11. Thus, the entire area of the tilting conveyor units 10/11 switched to the tilted orientation moves in the traveling direction of the tray T according to the conveying speed of the tray T, and the orientation of each tilting conveyor unit 10/11 is controlled such that the tilting conveyor units 10/11 having departed rearward from the area are sequentially returned from the tilted orientation to the horizontal orientation. Then, the tilting conveyor units 10/11 within the area supporting the tray T which completed the discharge of the conveyed object W for sorting are returned and swung from the tilted orientation to the horizontal orientation. Each tilting conveyor unit 10/11 on the downstream side of the area supporting the tray T is once swung downward from the horizontal orientation to an angle continuing with the tilting conveyor unit 10/11 in the process of returning to the horizontal orientation directly therebehind and then returned and swung to the horizontal orientation integrally with the tilting conveyor unit 10/11 in the process of returning to the horizontal orientation directly therebehind. By this series of operations, the tray T which completed the discharge of the conveyed object W for sorting is returned to the horizontal orientation while traveling at a predetermined speed, and is finally sent out onto the carry-out conveyor 3 in the horizontal orientation.

Figure 8:
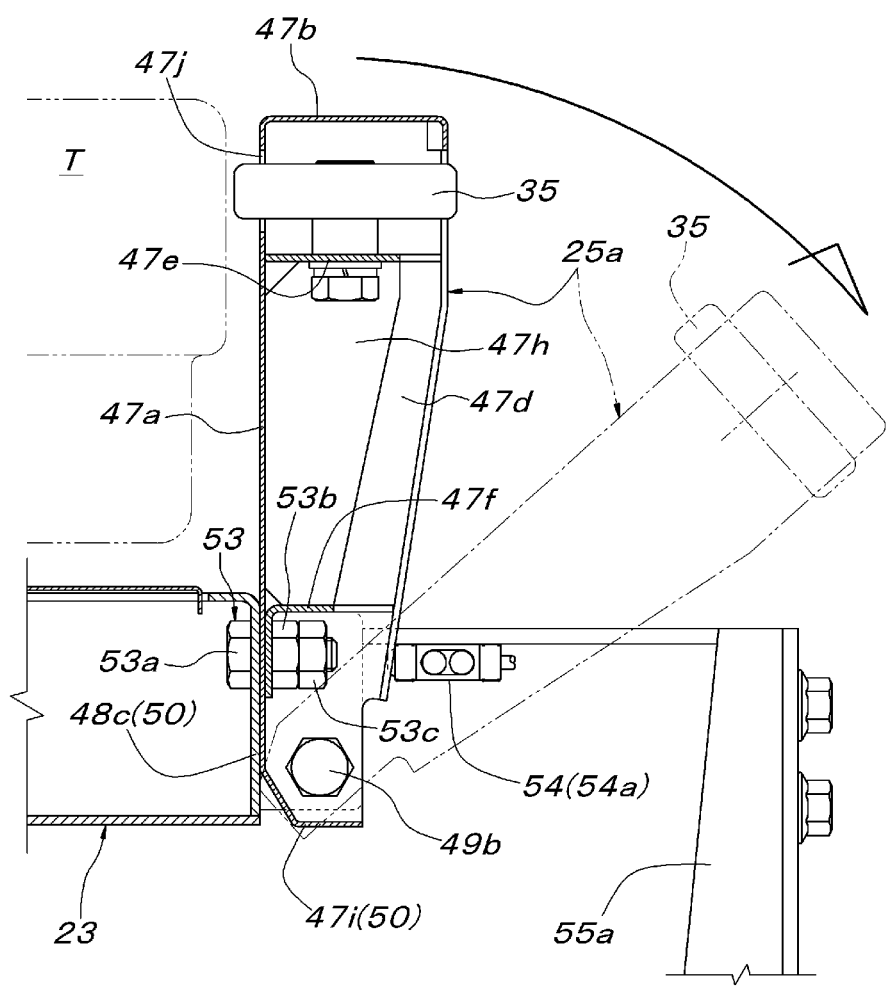
FIG. 8 is a longitudinal sectional front view showing a main part of an embodiment of the present invention.
Figure 9:
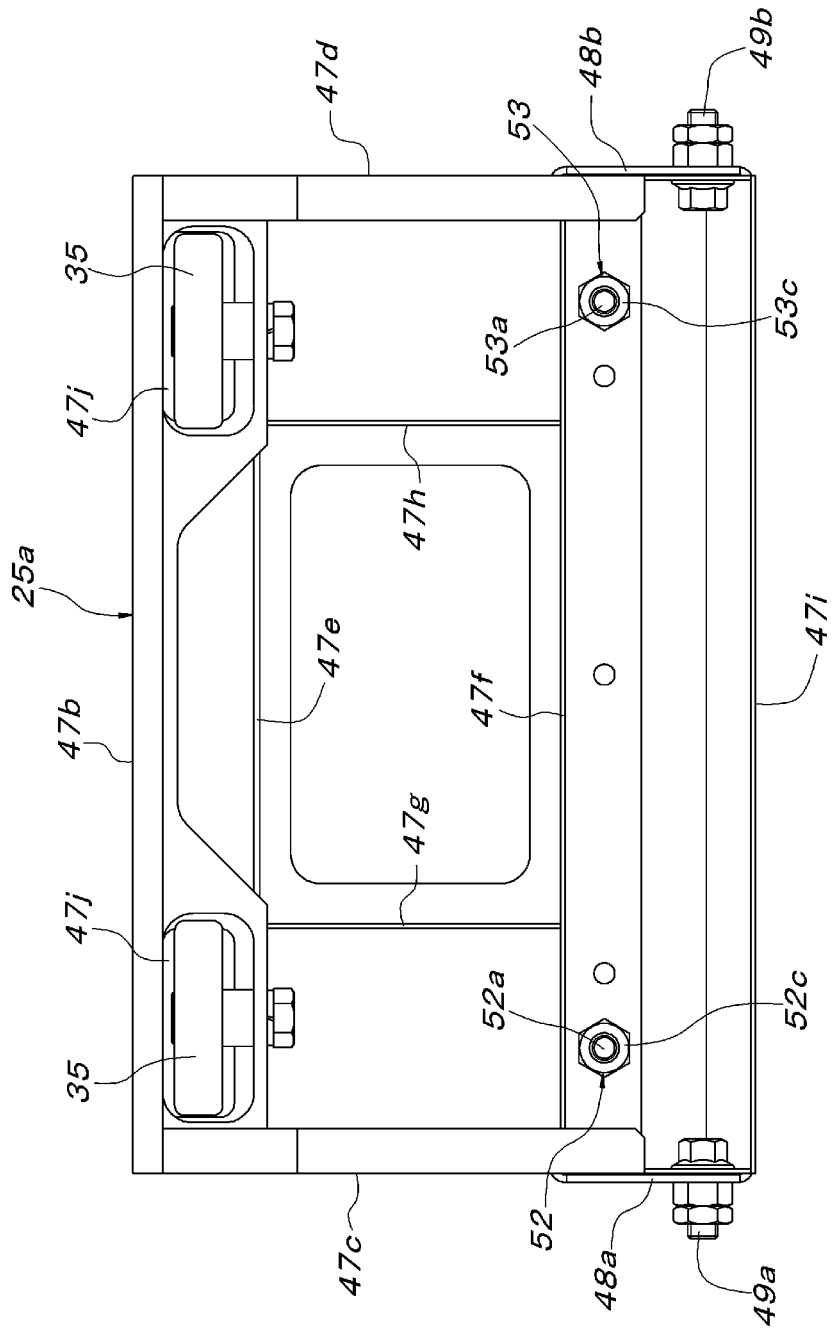
FIG. 9 is a side view showing the main part of the embodiment of the present invention.
Figure 10:
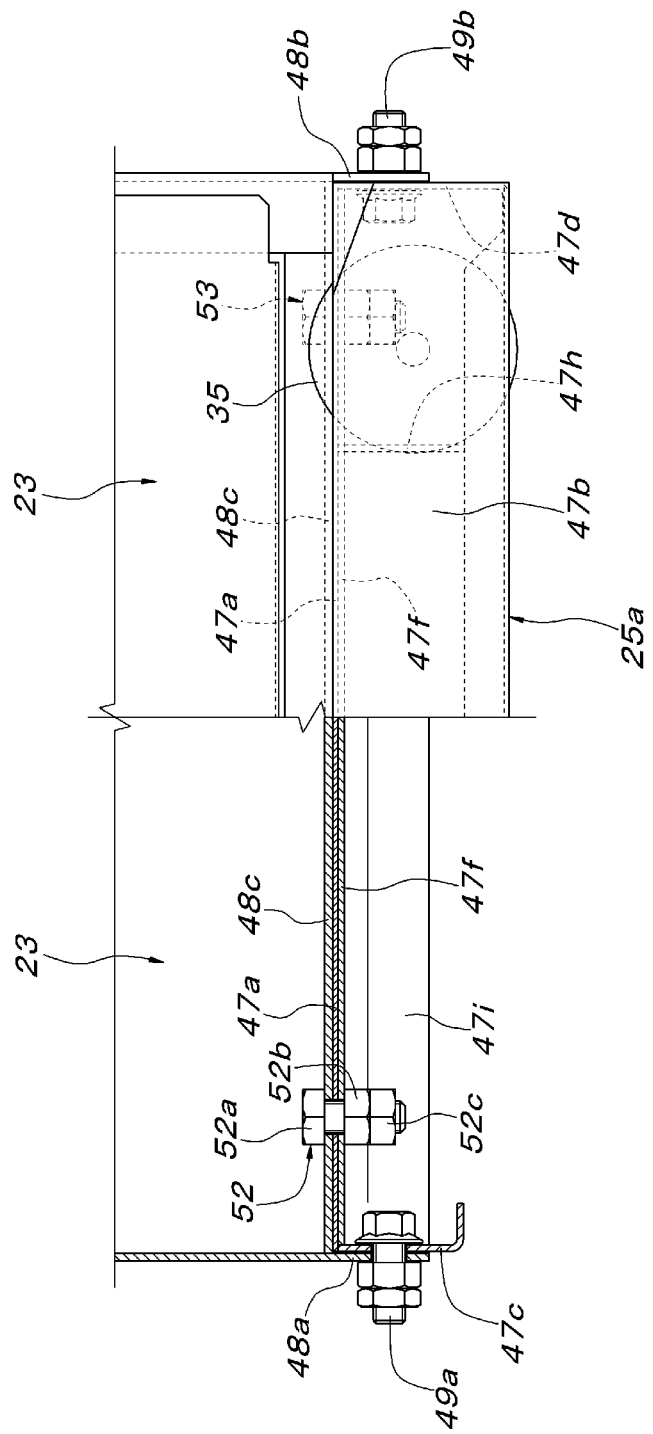
FIG. 10 is a partial cross sectional plan view showing the main part of the embodiment of the present invention.

In the conveying and sorting apparatus configured and used as described above, the both left and right side guides 25a, 25b of each tilting conveyor unit 10/11 are configured as follows in accordance with the present invention. That is, as shown in FIG. 8 to FIG. 10, the both left and right side guides 25a, 25b are each composed of a horizontally long rectangular inner side plate 47a facing the conveying path of the tray and a band-shaped upper side plate 47b, both front and rear side plates 47c, 47d connecting the inner side plate 47a and the upper side plate 47b, a bearing plate 47e horizontally fixed to the inner side plate 47a below the upper side plate 47b, a reinforcing angle member 47f horizontally fixed to an outer surface closer to a lower end of the inner side plate 47a, and a pair of front and rear reinforcing support plates 47g, 47h vertically fixed between the reinforcing angle member 47f and the bearing plate 47e. A lower side of the inner side plate 47a is bent outward to form a bent bottom plate portion 47i fixed to the both front and rear side plates 47c, 47d. The guide rollers 35 pivotally supported by the side guide 25a, 25b are configured to be pivotally supported by vertical support shafts respectively above the bearing plate 47e and have peripheral portions exposed inward from opening portions 47j formed in the inner side plate 47a.

The side guides 25a, 25b configured as above have lower end portions attached to both left and right sides of the structure 23 of the tilting conveyor unit 10/11 by pairs of front and rear bolts and nuts 49a, 49b concentric with each other and are pivotally supported so as to be swingable in the left-right lateral direction with bolts of the bolts and nuts 49a, 49b as support shafts. The structure 23 is a flat box shaped frame structure which is supported by the support shaft 7 so as to be swingable left and right and provided with a pair of left and right belt conveyors 24a, 24b. Lower end portions of the both front and rear side plates 47c, 47d of the side guides 25a, 25b overlap the inside of a pair of front and rear bearing plates 48a, 48b formed by extending the both front and rear side plates of the structure 23 laterally outward, and the bolts and nuts 49a, 49b penetrate through the overlapping portions. Accordingly, as shown in FIG. 8, the side guides 25a, 25b are swingable in the left and right lateral direction with the bolts of the bolts and nuts 49a, 49b as support shafts between a vertical standing orientation in which the lower end portions of the inner side plates 47a of the side guides 25a, 25b abut the both left and right side plate portions 48c of the structure 23 and a tilted orientation in which the bent bottom plate portions 47i abut the both left and right side plate portions 48c of the structure 23. In other words, an opening restricting means 50 receiving, at a certain angle, the side guides 25a, 25b opened outward from the vertical standing orientation is formed by the both left and right side plate portions 48c on the structure 23 side and the bent bottom plate portions 47i on the side guides 25a, 25b side.

An orientation holding means 51 holding the side guides 25a, 25b configured as above in the vertical standing orientation is formed by the both left and right side plate portions 48c of the structure 23, the inner side plates 47a of the side guides 25a, 25b, and pairs of front and rear bolts and nuts 52, 53 penetrating through, in the left and right horizontal direction, vertical plate portions of the reinforcing angle members 47f overlapping the inner side plates 47a, and fixing the inner side plates 47a of the side guides 25a, 25b to the both left and right side plate portions 48c of the structure 23. In the bolts and nuts 52, 53, all of bolts 52a, 53a and double nuts 52b, 52c and 53b, 53c may be made of synthetic resin. However, it is desirable in terms of the cost as well that only the bolts 52*a*, 53*a* are made of synthetic resin and the nuts 52*b* to 53*c* are made of iron. With this configuration, when the side guides 25*a*, 25*b* held in the vertical standing orientation with respect to the structure 23 by the bolts and nuts 52, 53 of the orientation holding means 51 are pressed outward by external force of a certain level or more, the synthetic resin bolts 52*a*, 53*a* are broken between the head portions and the shaft portions and the side guides 25*a*, 25*b* are released from the link to the structure 23 to be freed, opened outward around the bolts and nuts (support shafts) 49*a*, 49*b*, and received by the opening restricting means 50. The magnitude of the outward external force allowing the outward opening of the side guides 25*a*, 25*b* is determined by the breaking strength of the synthetic resin bolts 52*a*, 53*a* used for the bolts and nuts 52, 53. Thus, the breaking strength determined according to the shaft diameter and the material, etc., of the synthetic resin bolts 52*a*, 53*a* has only to be selected such that the side guides 25*a*, 25*b* can be held in the vertical standing orientation until a predetermined level or more of outward pressing force acts.

As shown in FIG. 9, the pair of front and rear bolts and nuts 52, 53 are arranged between the pair of front and rear bolts and nuts 49*a*, 49*b* pivotally supporting the side guide 25*a*, 25*b* and at two front and rear places relatively close to the bolts and nuts 49*a*, 49*b*. However, as shown by virtual lines, the pair of front and rear bolts and nuts 52, 53 may be arranged at two front and rear places away from the bolts and nuts 49*a*, 49*b* further inward or may be arranged at one place at the center between the bolts and nuts 49*a*, 49*b* or at a total of three places, one place at the center between the bolts and nuts 49*a*, 49*b* and two places on both sides. In practice, it is considered that there is almost no chance that an external force acts perpendicularly outward with respect to one place of a central portion in the front-rear width direction of the side guide 25*a*, 25*b*. Thus, the pair of front and rear bolts and nuts 52, 53 are desirably arranged between the pair of front and rear bolts and nuts 49*a*, 49*b* and at two front and rear places relatively close to the bolts and nuts 49*a*, 49*b*.

Since the side guides 25*a*, 25*b* are attached to the both left and right sides of the structure 23 of the tilting conveyor unit 10/11 as described above, when the tray T continuing forward traveling by the belt conveyors 24*a*, 24*b* of each tilting conveyor unit 10/11 travels in a state of being always received by the pair of front and rear guide rollers 35 of the side guide 25*a*/25*b* that becomes the lower side of the tilt of each tilting conveyor unit 10/11 at the time of sorting operation involving the swinging of each tilting conveyor unit 10/11 from the horizontal orientation to the tilted orientation and the opposite swinging from the tilted orientation to the horizontal orientation, no unreasonable outward force from the tray T side acts on the side guide 25*a*/25*b*, and each side guide 25*a*/25*b* is held in the vertical standing orientation with respect to the structure 23 by the pair of front and rear bolts and nuts 52, 53 of the orientation holding means 51.

However, when the operation performed in the latter half of the above-described sorting operation, that is, the swinging operation of the tilting conveyor unit 10/11 on the downstream side of the tray T traveling forward, is performed where the relative positional relationship with the tray T traveling forward goes out of order due to a change in the traveling speed or a slight change in the orientation, etc., of the tray T traveling forward, the front end corner of the tray T traveling forward collides with the side guide 25*a*/25*b* on the lower side of the tilt of the swinging tilting conveyor unit 10/11 in some cases. Since a large outward pressing force different from that in the normal condition acts on the side guide 25*a*/25*b* on the lower side of the tilt at this time, the synthetic resin bolt(s) 52*a*/53*a* of both of the pair of front and rear bolts and nuts 52, 53 of the orientation holding means 51 or one of the bolts and nuts which is closer to the place receiving the pressing force are/is broken by the pressing force at this time, and the entirety or one of the front and rear sides of the side guide 25*a*/25*b* on the lower side of the tilt is freed, and the side guide 25*a*/25*b* is opened outward around the bolts and nuts (support shafts) 49*a*, 49*b*. Thus, the side guide 25*a*/25*b* is prevented from being significantly deformed and damaged by the pressing force.

The overall configuration of the conveying and sorting apparatus provided with the tilting conveyor units 10, 11 to which the side guides 25*a*, 25*b* are attached in accordance with the present invention is not limited to the configuration of one embodiment described above. For example, a driving means for tilting each tilting conveyor unit 10, 11, a type of the conveyor for moving the tray T on each tilting conveyor unit 10, 11 and a driving method of the conveyor can adopt any configuration irrespective of the present invention. Further, when the sorting direction of the tilting conveyor units 10, 11 is limited to one of the left and right sides, of the side guides 25*a*, 25*b*, only the side guide 25*a*/25*b* on the sorting direction side has only to be configured according to the present invention.

However, even in the conveying and sorting apparatus in which the sorting direction of the tilting conveyor units 10, 11 is limited to one of the left and right sides, it is desirable that the side guides 25*a*, 25*b* on the both left and right sides of the tilting conveyor units 10, 11 are configured according to the present invention. This is because it is also considered that, when the front end corner of the tray T violently collides with the side guide 25*a*/25*b* on the lower side of the tilt, the tray T is significantly tilted on the traveling path by the reaction and the rear end corner violently collides with the side guide 25*a*/25*b* on the upper side of the tilt. When such a phenomena occurs, the side guide 25*a*/25*b* on the upper side of the tilt is made free and opened outward by configuring the side guides 25*a*, 25*b* on the both left and right sides according to the present invention in advance, and a significant deformation and damage can be prevented beforehand.

When the side guide 25*a*/25*b* is released from the holding in the vertical standing orientation by the orientation holding means 51 and opened outward to an angle restricted by the opening restricting means 50 in the latter half of the sorting operation as described above, the tilting conveyor unit 10/11 including the side guide 25*a*/25*b* in the opened orientation is returned to the horizontal orientation. This abnormal event needs to be detected swiftly by a detecting means to urgently stop the conveying and sorting apparatus and notify a facility manager by a warning buzzer/light, etc. For this purpose, it is considered to attach, to each tilting conveyor unit 10/11, a detecting means for detecting the side guide 25*a*/25*b* released from the holding in the standing orientation by the orientation holding means (51) and opened. The detecting means is desirably configured as follows.

That is, when the tilting conveyor unit 10/11 is returned to the horizontal orientation with the side guide 25*a*, 25*b* left opened, the side guide 25*a*, 25*b* left opened protrudes to one side or both sides of originally flat left and right side portions of a group of a plurality of tilting conveyor units 10/11 arranged in a straight line. To detect the side guide(s) 25*a*, 25*b* left opened, as shown in FIG. 1B, the detecting means can be formed by a photoelectric sensor 54 irradiating a detection light beam 54c detecting the side guide(s) 25a, 25b in an opened state from one end to the other end of the group of the plurality of tilting conveyor units 10/11 arranged in a straight line (the illustrated example is the entire conveying and sorting apparatus). As the photoelectric sensor 54, besides a photoelectric sensor formed by a light projector 54a irradiating the detection light beam 54c and a light receiver 54b receiving the detection light beam 54c, a reflective photoelectric sensor in which a light projector/receiver set provided with a light projector and a light receiver is used in place of the light projector 54a and a reflector is arranged in place of the light receiver 54b can be used. As a matter of course, when the reflective photoelectric sensor is used, the reflector can be attached to a side surface on the side where the light projector 54a is located of each side guide 25a, 25b, without arranging the reflector in place of the light receiver 54b. In the former configuration, an abnormality detection is turned ON when a situation occurs that the detection light beam from the light projector is blocked by the side guide 25a, 25b in an abnormal orientation of being opened and the light receiver does not receive the light beam. In the latter configuration, the abnormality detection is turned ON when the detection light beam from the light projector is reflected by the reflector of the side guide 25a, 25b in the abnormal orientation of being opened and the light receiver receives the reflected light beam.

As shown in FIG. 1A, FIG. 1B, and FIG. 4 to FIG. 6, the light projector 54a irradiating the detection light beam 54c can be attached, via a supporting bracket, inside an upper end portion of a columnar support member 55a erected on the frame 16 on one end side of the entire conveying and sorting apparatus, for example, an end portion on the side where the carry-in conveyor 2 is located. The light receiver 54b (or the reflector) receiving the detection light beam 54c can be attached, via a supporting bracket, inside an upper end portion of a columnar support member 55b erected on the frame 16 on the other end side of the entire conveying and sorting apparatus. The position of the detection light beam 54c is desirably configured to be a position close to the outside of an area on the lower end side of the side guide 25a, 25b in the vertical standing orientation so that, even if the tilt angle of the side guide 25a, 25b is freed and opened outward slightly changes, that side guide 25a, 25b can be detected.

Further, another embodiment will be described based on FIG. 11 to FIG. 13. The shaft portions of the synthetic resin bolts 52a, 53a and the double nuts 52b, 52c and 53b, 53c screw-fitted thereto protruding inside the side guide 25a, 25b of the pair of front and rear bolts and nuts 52, 53 in the above embodiment are coupled to each other by a scatter preventing cord-like body 56. As the cord-like body 56, a flexible thin metal wire rod generally called a wire and a chain, etc., can be used. The cord-like body 56 has both ends attached with a mounting plate 57. The mounting plate 57 is made of a metal thin plate provided with a through hole through which the shaft portion of the synthetic resin bolt 52a, 53a of the bolt and nut 52, 53 is inserted, and is sandwiched and fixed between the double nuts 52b, 52c and between the double nuts 53b and 53c. The cord-like body 56 has an end portion fixed with a terminal plate 56a by caulking, and the terminal plate 56a is attached to the mounting plate 57 by a fixing tool 56b such as a screw nut or rivet.

The plate portion 48c on the structure 23 side and the plate portion 47a on the side guide 25a, 25b side linked by the bolts and nuts 52, 53 are provided with two through holes 58a, 58b so as to be penetrated concentrically with each other at positions near the both bolts and nuts 52, 53. An intermediate portion of the scatter preventing cord-like body 56 whose both ends are coupled to the bolts and nuts 52, 53 as described above bypasses the inside of the structure 23 through the two through holes 58a, 58b.

As a method of stretching the cord-like body 56 as described, the other end of the cord-like body 56 to which the mounting plate 57 is attached only at one end via the terminal plate 56a is inserted inside the structure 23 from one of the through holes 58a, and then the other end of the cord-like body is inserted through the side guide 25a, 25b side from the other through hole 58b, and finally the terminal plate 56a and the mounting plate 57 can be attached to the other end of the cord-like body 56. When the through holes 58a, 58b have an inner diameter through which the terminal plates 56a can be inserted, the terminal plates 56a can be attached to both ends of the cord-like body 56 in advance. When the through holes 58a, 58 have an inner diameter through which the mounting plates 57 can be inserted, the mounting plates 57 can also be attached to both ends of the cord-like body 56 via the terminal plates 56a in advance. In either case, the mounting plates 57 attached, via the terminal plates 56a, to both ends of the cord-like body 56 withdrawn inside the side guide 25a, 25b from each through hole 58a, 58b are sandwiched and fixed between the double nuts 52b, 52c and between the double nuts 53b, 53c protruding inside the side guide 25a, 25b of the bolts and nuts 52, 53.

According to the above-described configuration, as described above, the side guide 25a, 25b receives an outward overload, breaks the synthetic resin bolts 52a, 53a of the bolts and nuts 52, 53, and opens around the bolts and nuts 49a, 49b (support shafts). Since the break of the synthetic resin bolts 52a, 53a occurs between their head portions and shaft portions, the head portions of the synthetic resin bolts 52a, 53a located on the structure 23 side drop inside the structure 23 and are received, as shown in FIG. 13B. Nut side broken pieces including the double nuts 52b, 52c and 53b, 53c of the bolts and nuts 52, 53 and the shaft portions of the synthetic resin bolts 52a, 53a located within the side guide 25a, 25b opened outward attempt to violently scatter outward. However, the nut side broken pieces of both bolts and nuts 52, 53 are connected to each other by the cord-like body 56, jump out from the inside of the side guide 25a, 25b by an extra length of the cord-like body 56, and brought into a state where the cord-like body 56 is suspended by the cord-like body 56 from the two through holes 58a, 58b through which the cord-like body 56 is inserted. That is, the nut side broken pieces no longer violently scatter when the bolts and nuts 52, 53 are broken.

Figure 11:
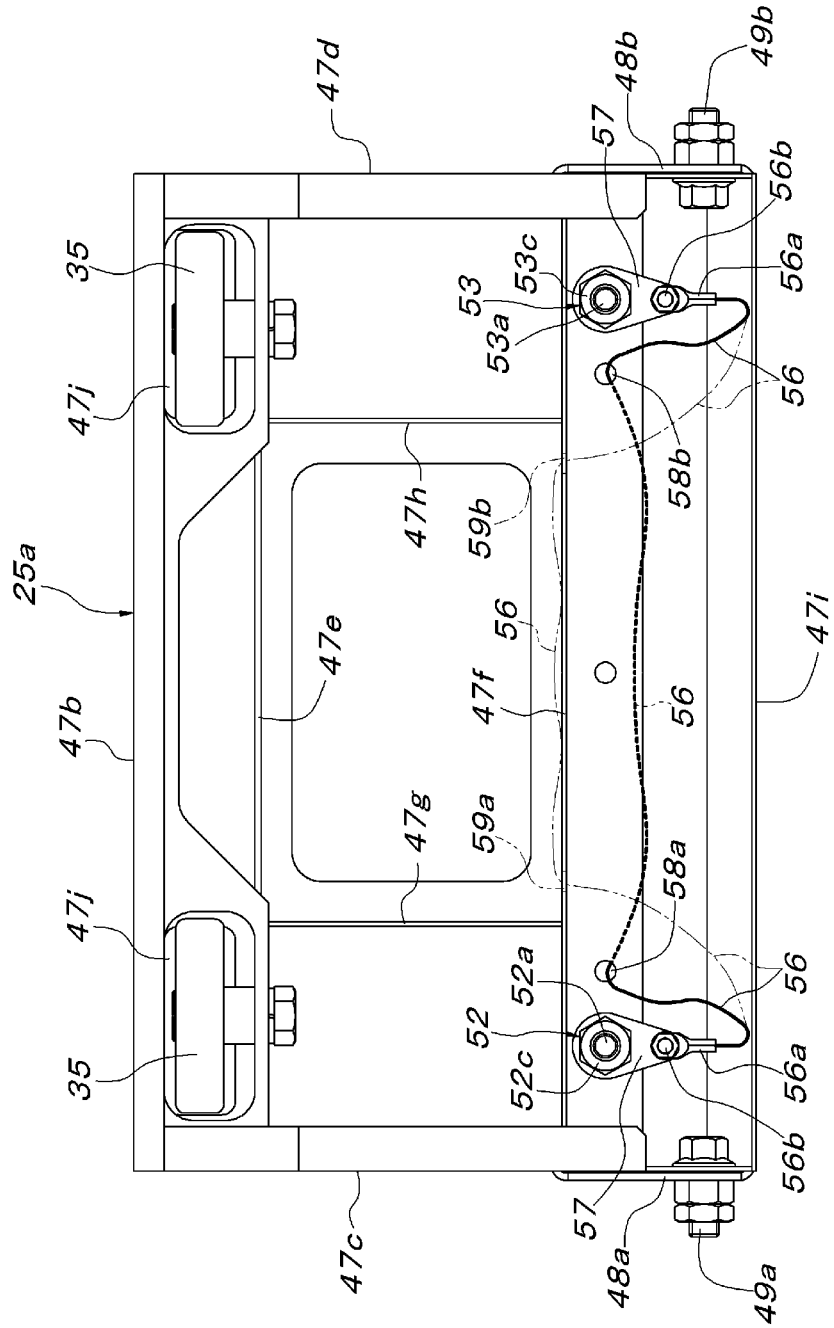
FIG. 11 is an outer side view of a side guide showing a second embodiment of the present invention.
Figure 12:
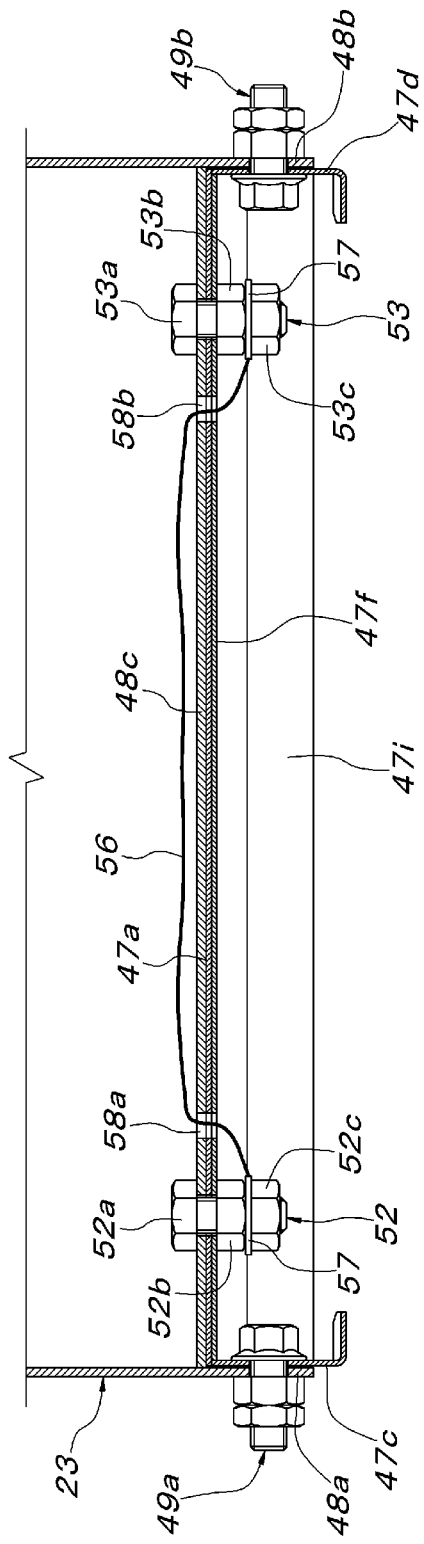
FIG. 12 is a cross sectional plan view of a main part of FIG. 11.
Figure 13A:
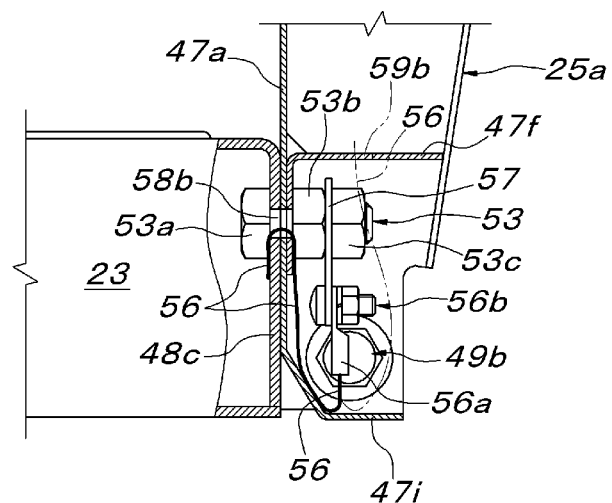
FIG. 13A is a longitudinal sectional front view showing a normal condition of the main part of FIG. 11.
Figure 13B:
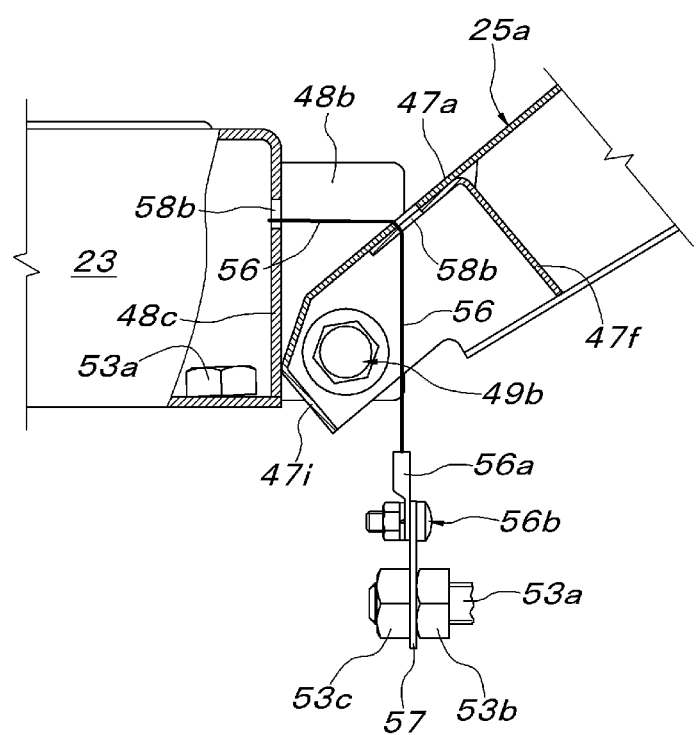
FIG. 13B is a longitudinal sectional front view showing an abnormal condition of the main part of FIG. 11.

In addition, as shown by virtual lines in FIG. 11 and FIG. 13A, respectively, two through holes 59a, 59b are provided to the reinforcing angle member 47f disposed above the bolts and nuts 52, 53 in the side guide 25a, 25b, and the intermediate portion of the cord-like body 56 whose both ends are coupled to the double nuts 52b to 53c side of the both bolts and nuts 52, 53 can bypass the upper side of the reinforcing angle member 47f (the side opposite to the side where the bolts and nuts 52, 53 are located) via the two through holes 59a, 59b. Further, in the configuration described above, the inner diameter of the through holes 58a, 58b or 59a, 59b for allowing the cord-like body 56 to bypass is desirably set to be an inner diameter through which the terminal plates 56a fixed to the end portions of the cord-like body 56 in advance can be inserted. However, if the end portions of the cord-like body 56 can be directly linked to the mounting plates 57 on-site by a method such as caulking, the terminal plates 56a can be omitted. As a matter of course, when there is one bolt and nut for fixing each side guide 25a, 25b to the structure 23 in the standing orientation, the free end portion of one cord-like body linked to the nut side of the bolt and nut has only to be locked at an appropriate place of the side guide 25a, 25b or the structure 23 via a fixing tool.

INDUSTRIAL APPLICABILITY

The conveying and sorting apparatus of the present invention can be utilized as a conveyed object conveying and sorting apparatus such that the conveyed object is loaded and conveyed on a dedicated conveying tray and also required to be sorted automatically according to the destination, as in the luggage conveyance and sorting at airports.

What is claimed is:

1. A conveying and sorting apparatus comprising:
a plurality of tilting conveyor units arranged in a row in a conveying direction, each of the tilting conveyor units supported so as to be swingable left and right about a support shaft parallel to a conveying direction of a conveyed object between a horizontal conveying direction and a tilted orientation for discharging the conveyed object laterally with respect to the conveying direction of the conveyed object by gravity, and having side guides erected on both sides in a left-right swinging direction and regulating a conveying path width;
of the side guides, at least a side guide on a side of swinging to the tilted orientation is supported so as to be openable to a swinging direction side toward the tilted orientation with respect to a structure of the tilting conveyor unit, and is juxtaposed with an orientation holding means holding the side guide in a standing orientation until load of a certain level or more in an opening direction acts on the side guide.

2. The conveying and sorting apparatus according to claim 1, wherein the side guides comprise left and right side guides and both of the left and right side guides are supported so as to be openable outward with respect to the structure of the tilting conveyor unit and are juxtaposed with orientation holding means holding the side guides in a standing orientation until load of a certain level or more in the opening direction acts on the side guides.

3. The conveying and sorting apparatus according to claim 1, wherein the orientation holding means is formed by plate portions provided to the structure and the side guide and overlapping each other in a left-right lateral direction, and a bolt and nut penetrating through and linking the both plate portions in the left-right lateral direction, and the bolt and nut is configured such that at least the bolt thereof is made of synthetic resin and a synthetic resin portion of the bolt and nut is broken when load of a certain level or more in the opening direction acts on the side guide.

4. The conveying and sorting apparatus according to claim 3, wherein the bolt and nut is arranged in an orientation in which a bolt head portion is located on a structure interior side of the plate portion on the structure side of the both plate portions, and a bolt and nut part located outside the plate portion on a side guide side of the bolt and nut is linked to one end side of a scatter preventing cord-like body, and the other end side of the cord-like body is locked to the structure or the side guide.

5. The conveying and sorting apparatus according to claim 4, wherein the one end side of the scatter preventing cord-like body is attached with a mounting plate through which the bolt of the bolt and nut penetrates and which is sandwiched and fixed by a double nut used for the bolt and nut part.

6. The conveying and sorting apparatus according to claim 4, wherein the side guide is pivotally supported by a pair of concentric front and rear support shafts so as to be swingable left and right, and the bolt and nut is provided in a front and rear pair between the both support shafts, and the scatter preventing cord-like body linked to the bolt and nut parts located outside the plate portion on the side guide side of the both bolts and nuts is connected so as to form a single cord on the side opposite to the side where the bolt and nut parts are located of the structure or the side guide, through two through holes provided to the structure or the side guide.

7. The conveying and sorting apparatus according to claim 1, wherein an opening restricting means to receive, at a certain angle, the side guide released from the holding in the standing orientation by the orientation holding means and opened is provided.

8. The conveying and sorting apparatus according to claim 7, wherein a detecting means to detect the side guide released from the holding in the standing orientation by the orientation holding means and opened is juxtaposed.

9. The conveying and sorting apparatus according to claim 8, wherein the detecting means is formed by a photoelectric sensor irradiating a detection light beam detecting the side guide in an opened state from one end to the other end of a group of the plurality of tilting conveyor units arranged in a row in the conveying direction.

* * * * *